Oct. 13, 1970   M. A. SULLIVAN   3,533,186
AIRFOIL STRUCTURE HAVING A MOLDED PLASTIC CORE
Filed Dec. 11, 1967   2 Sheets-Sheet 1
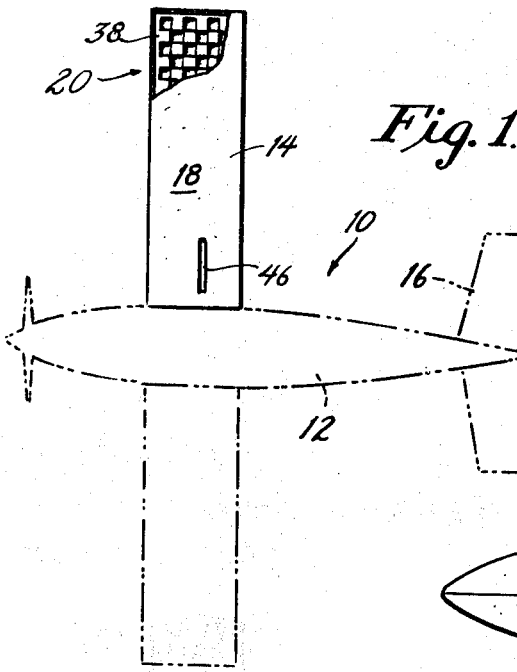
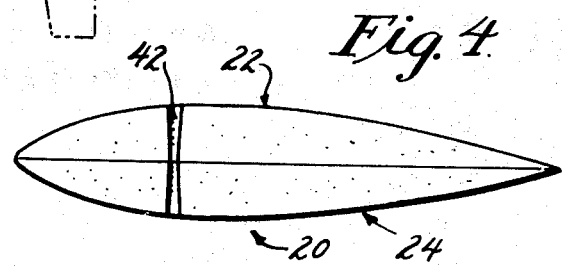
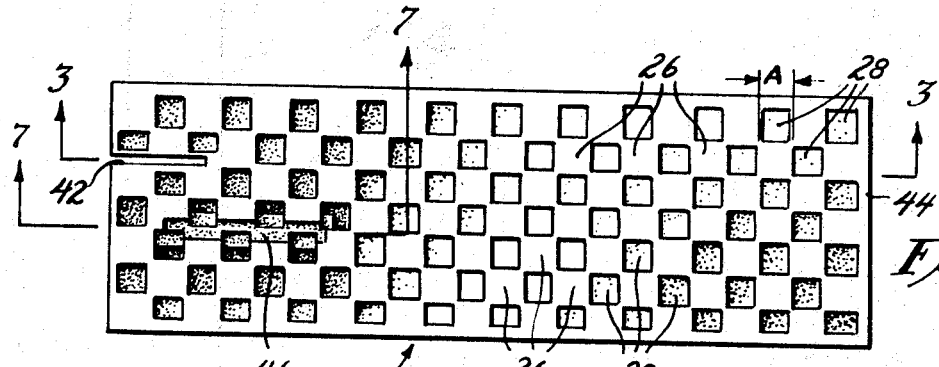
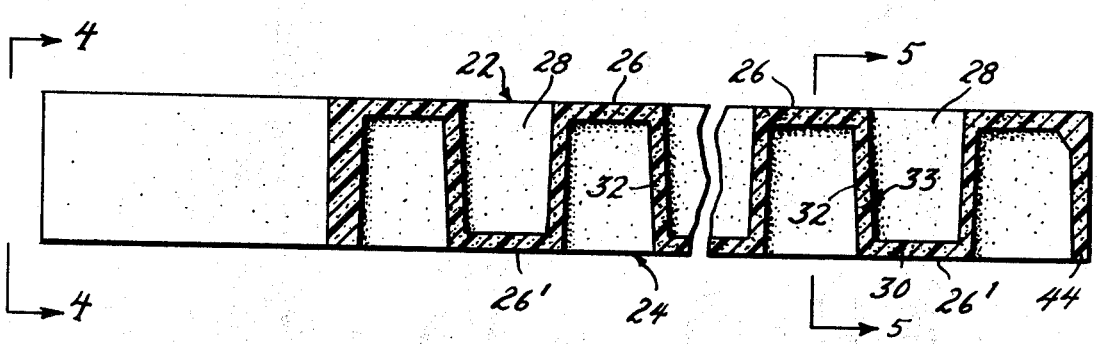
INVENTOR
MATTHEW A. SULLIVAN
BY
Seidel & Gonda
ATTORNEYS.

Oct. 13, 1970     M. A. SULLIVAN     3,533,186
AIRFOIL STRUCTURE HAVING A MOLDED PLASTIC CORE
Filed Dec. 11, 1967                                                     2 Sheets-Sheet 2

INVENTOR.
MATTHEW A. SULLIVAN
BY    Seidel & Gonda
ATTORNEYS.

United States Patent Office 3,533,186
Patented Oct. 13, 1970

3,533,186
AIRFOIL STRUCTURE HAVING A
MOLDED PLASTIC CORE
Matthew A. Sullivan, Elkins Park, Pa., assignor to Sullivan Products Incorporated, Willow Grove, Pa., a corporation of Pennsylvania
Filed Dec. 11, 1967, Ser. No. 689,579
Int. Cl. A63h 27/00
U.S. Cl. 46—76                                                                 9 Claims

ABSTRACT OF THE DISCLOSURE

An airfoil structure of composite construction, wherein the core is of plastic polymeric material, and is so formed that each of the opposite faces defining the airfoil profile has successive alternate surface portions and recesses, arranged in rows. The structural elements forming the bottoms of the recesses in one face define surface portions of the other face.

---

This invention relates to airfoil structures, and more particularly to structure suitable for use as the wings and empennage of model aircraft.

Numerous construction methods have been proposed for the wings and tail surfaces of model aircraft. Most frequently, these structures include a rigid frame comprising longitudinally extending or "spanwise" leading edge, trailing edge and spar members intersecting transverse or "chordwise" ribs. The frame structure is then, conventionally, covered with a flexible material which defines the aerodynamic form of the finished structure. Known material are non-woven sheet material such as Japanese tissue, silk-span, or the like, and woven fabrics such as silk or nylon. As an alternative, it is known to use sheet balsa wood covering.

It has also been proposed to construct model aircraft structures of plastic, such as expanded polystyrene; or plastic and wood composites. Thus, for example, a solid expanded plastic core may be provided, and covered with balsa sheet. A common shortcoming, however, of known plastic or composite structures using plastic as a major structural element has been excessive weight and/or cost, matters of critical importance in model aircraft.

It is a general object of this invention to provide a light and inexpensive plastic airfoil structure, suited to use in model aircraft. The foregoing general object is accomplished by a structure including a core of plastic polymeric material, so formed that its opposite outer faces define in overall cross-section an airfoil profile. The core in accordance with the present invention includes alternate surface portions and recesses arranged in rows across the respective outer faces, and so formed that the structural elements forming the bottoms of recesses in one of the opposite faces define surface portions on the other face. Thus, a cross section taken along the rows of surface portions and recesses reveals a continuous crenallated element extending the length of the row. The resulting core weighs a mere one-half as much as a solid piece of like dimensions, and provides sufficient surface area on its faces to ensure a true, uniform aerodynamic shape when covered as described hereinafter. Also, the surface portions provide more than adequate area for securement of the covering material to the core. The recesses which characterize the novel core may be a tapering cross-section, thereby ensuring ease of mold release.

In view of the foregong, it is an object of the present invention to provide a novel airfoil structure, particularly suited for use in model aircraft.

It is another object to provide a novel aircraft structure wherein a preformed core of plastic polymeric material is covered with an outer skin of wood or the like.

It is another object to provide a core of plastic polymeric material for use in an airfoil structure, which is strong, light in weight, and easily manufactured.

Other objects will appear hereinafter.

For the purpose of illustrating the invention there is shown in the drawings a form which is presently preferred; it being understood, however, that this invention is not limited to the precise arrangements and instrumentalities show.

FIG. 1 is a plan view of a model aircraft, partially in phantom and partially broken away, showing the use of the present airfoil structure.

FIG. 2 is a plan view showing one face of the novel core of an airfoil structure in accordance with the present invention.

FIG. 3 is a cross-sectional view, partially broken away, taken along line 3—3 of FIG. 2.

FIG. 4 is a side elevation view along the line 4—4 in FIG. 3, showing the manner in which the opposite outer faces of the core define an airfoil profile.

Figure 5:
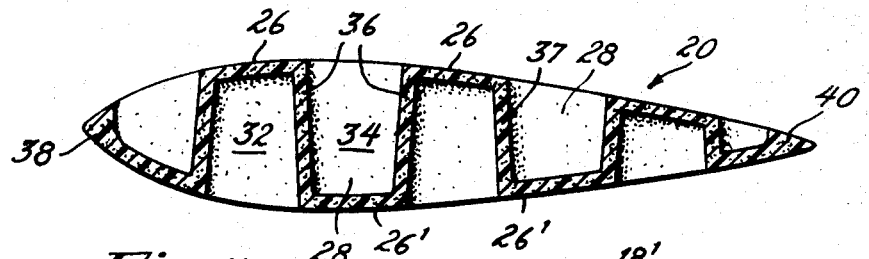
FIG. 5 is a cross-sectional view taken along the line 5—5 in FIG. 3.

Referring now to the drawings in detail, wherein like numerals indicate like elements, there is seen in FIG. 1 a model aircraft designated generally by the reference numeral 10. The model aircraft 10 includes a fuselage 12, wing structure 14 and empennage 16. As may also be seen in FIG. 1, the wing structure 14 includes an outer covering 18, partially broken away, and an internal core designated generally by the numeral 20.

Referring now to FIGS. 2, 3 and 4, the core 20, which forms an important part of the present invention, is seen in greater detail. The core 20, as is best seen in FIG. 4, has opposite faces designated generally by the numerals 22 and 24, respectively, defining opposite contours of an airfoil profile. The profile seen in FIG. 4 is a symmetrical biconvex section, but of course, other profiles could be used with equal facility.

Referring in particular to FIG. 2, the configuration of the core is such that each of the opposite faces 22 and 24 has intersecting rows of successive alternate surface portions 26 and recesses 28, the recesses and portions in adjacent rows being offset from each other. In the illustrated embodiment, the intersecting rows are disposed in chordwise and spanwise directions. Structural elements 30, an example of which is seen in FIG. 3, define the closed ends of the recesses 28, and also, at the opposite edges thereof, surface portions 26. Thus, in FIG. 3, one surface of the element 30 defines the bottom of the recess 28 in the face 22, which may be referred to for convenience as the upper face, and also a surface portion 26' in the face 24, or lower face.

Figure 8:
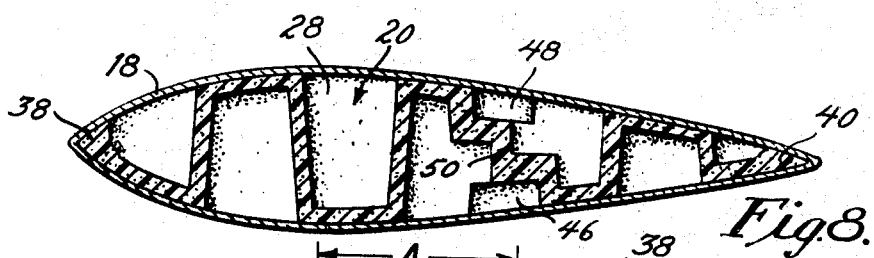
FIG. 8 is a cross-sectional view taken along the line 8—8 in FIG. 7, and showing covering material in place on the core.

Cross sections taken along the respective rows reveal crenallated structural elements, seen in FIGS. 3, 5 and 8. Thus, referring again to FIG. 3, the structural element 30, the unnumbered structural element including surface portion 26 in the upper face 22, and a wall portion 32 joining these elements define a portion of a continuous crenallated element designated 33 generally. Referring to FIG. 5, the wall portion 32, and those portions like it in adjacent spanwise rows, for example the wall portion designated 34, define a rib-like element extending in a chordwise direction. Wall portions 36 separate adjacent spanwise rows, and form a portion of chordwise crenallaed members, an example of which is designated generally by the numeral 37 in FIG. 5.

The core of the present invention may also be conveniently described as comprised of a series of structural units or "cells" in side-by-side relation. Referring again to FIG. 5, it is seen that the core 20 includes a thickened leading edge member or element 38, as well as a trailing edge member or element 40. The above-described chordwise crenallated member 37, therefore, extends between and links the leading and trailing edge members. The rib elements defined by the wall portions 32, 34, and the like, disposed on opposite sides of the crenallated member, complete the individual "cell." Referring to FIG. 9, the wall portions 32, 34, etc., provide rib elements for two adjacent cells, and for the purpose of analysis, chordwise lines bisecting such rib members may be considered the dividing lines between adjacent cells. Thus, the cell A in FIG. 3 is defined between bisectors of the rib-defining wall portions on either side of its crenallated element.

The above-described core construction provides great flexibility in design. Thus, the core 20 may be provided at its root end with one or more slots 42 for receiving spars or gussets. Of course, in some constructions, the wing may be assembled in the form of a single panel passing through the fuselage, in which case, such slots would not be required. Also, the core 20 may be provided at its tip end with a thickened end rib 44 providing a tip reinforcement. A recess 46 may be provided in one face of the core for securement of landing gear structure to the core 20, and if desired, such a recess may be provided in each of the faces 22 and 24 as in FIGS. 7 and 8.

Referring now to FIG. 8, provision of recesses such as recesses 46 and 48 results in an interruption of the regularity of the crenallated elements in the cells traversed by the recesses. Thus the chordwise element, designated 37′, includes a portion 50 having a long vertical dimension disposed in a plane perpendicular to the planes of the bottoms of recesses 46 and 48. The portion 50 is in effect a reinforcing beam, adapted to bear the local nonaerodynamic loads transmitted from the landing gear.

Figure 7:
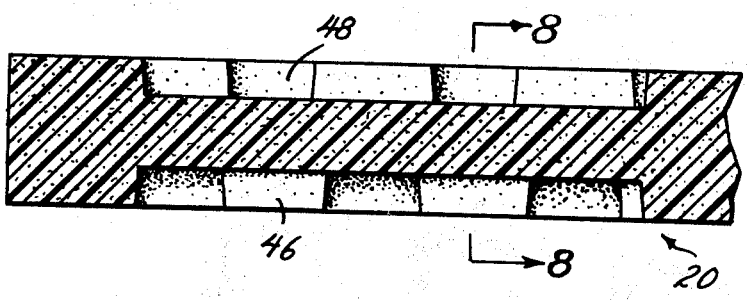
FIG. 7 is a partial cross-sectionl view taken along the line 7—7 in FIG. 2.

A wing 14 constructed with core 20 shown in cross-section in FIGS. 7 and 8, wherein the airfoil profile is symmetrical and recesses for securing landing gear are provided on both faces, may be used as a left or right wing with equal facility. Hence, a standard form may be used for both. It is, of course, within the purview of the invention to provide cores with nonsymmetrical air-foils, and with recesses on one side. Such cores would be usable as left or right panels only.

Figure 9:
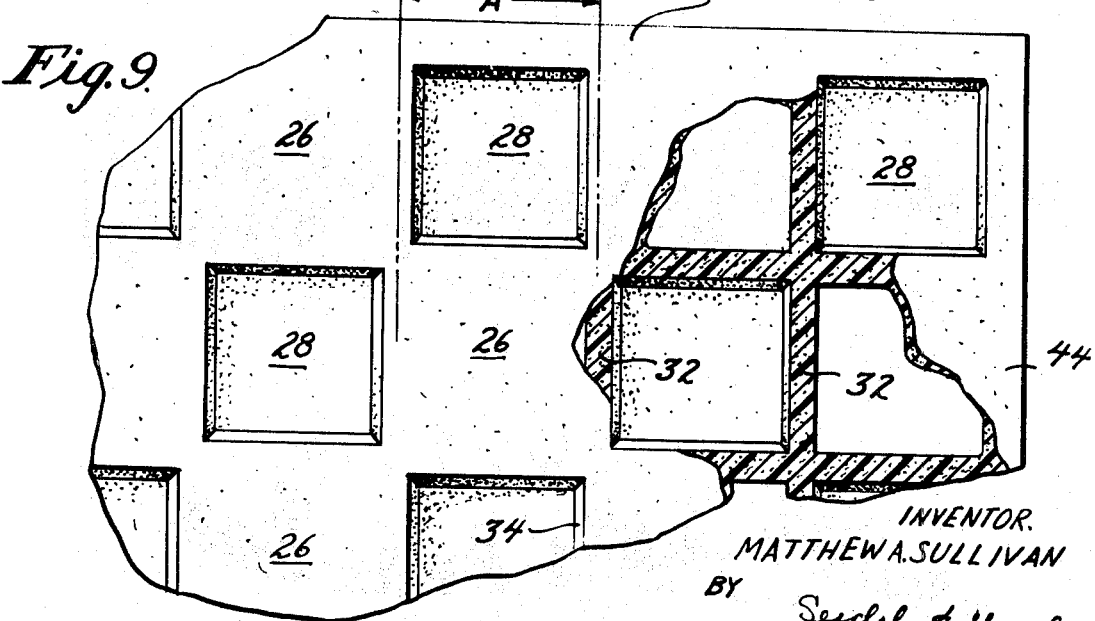
FIG. 9 is a detailed view, partially broken away, showing structural details of the core member.

An important aspect of the core 20 in accordance with the present invention is best seen in FIG. 9, and is also apparent from the cross-sectional views of FIGS. 3, 5 and 8. Thus, the recesses 28 are of tapering cross-section, having their narrowest dimension at their closed ends. Such configuration provides for ready removal from forming dies or molds, and ensures ease of manufacture.

Figure 6:
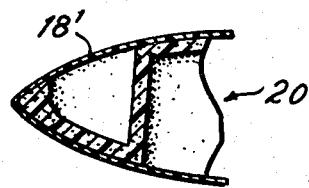
FIG. 6 is a partial cross-sectional view, similar to FIG. 5, and showing covering material in place on the core.

Referring now to FIGS. 1, 6 and 8, the outer covering 18 may be applied directly to the core 20. The surface portion 26 together with the leading and trailing edge members 38 and 40 all provide surfaces to which the covering may be secured. Indeed, an important advantage of the above-described core 20 is that 55% to 60% of its face area is supporting and securing surface for the covering. Thus, in FIG. 8, sheet balsa wood planking is glued to the core 20 at the leading and trailing edges and at surface portion 26 to provide the desired uninterrupted airfoil surfaces. In FIG. 6, a covering 18 of vinyl or mylar film is shown, secured to the core 20 in a similar manner. Of course, other covering materials will occur to those skilled in the art. Thus, conventional woven fabrics or nonwoven paper-base materials may be used.

The above description of the present airfoil structure has been directed primarily to wing structures for model aircraft. It should be apparent, however, that other model aircraft structures may also be constructed. Moreover, with suitable covering materials, the present airfoil structure is suited for use in small aerodynamic surfaces such as ailerons on full scale aircraft. The present construction provides an airfoil structure which is strong and durable, quickly constructed, and which subjects the model to little or no weight penalty. Morevore, the plastic polymeric core, which may be formed by simple processes from inexpensive materials such as expanded polystyrene or polyurethane or the like, is easily manufactured.

The present invention may be embodied in other specific forms without departing from the spirit or essential attributes thereof and, accordingly, reference should be made to the appended claims, rather than to the foregoing specification as indicating the scope of the invention.

I claim:

1. For use in an airfoil structure in a model aircraft, a core of plastic polymeric material, said core having opposite faces defining opposite contours of an airfoil profile, said opposite faces having a plurality of intersecting rows of successive surface portions and recesses, the recesses and surface portions in adjacent rows being offset from each other so that cross sections through said rows define crenellated structural elements, portions of said crenellated structural elements defining surface portions on one of said opposite faces and bottoms of recesses in the other of said opposite faces.

2. A core in accordance with claim 1, wherein said intersecting rows extend in spanwise and chordwise directions, respectively.

3. A core in accordance with claim 1, wherein said recesses are tapered toward the bottoms thereof to facilitate release of said core and mold.

4. A core in accordance with claim 1, wherein the plastic polymeric material of said core is of the expended type.

5. A core in accordance with claim 1, wherein said core includes a recessed reinforced portion in at least one of said opposite faces for receiving a member adapted to transmit nonaerodynamic loads to said core.

6. A core in accordance with claim 1, and a skin member coupled to said core and defining a continuous outer surface for said airfoil structure.

7. For use in an airfoil structure in a model aircraft, a core of plastic polymeric material, said core having opposite outerfaces and an outer cross section defining opposite contours of an airfoil profile, said core comprising a series of chordwise cells in side-by-side relation, each of said cells comprising a leading edge member, a trailing edge member, a crenellated member defining alternate and successive surface portions and recesses on opposite faces extending between said leading and trailing edge members, and rib elements at opposite edges of said crenellated member, the crenellated members of adjacent cells being offset so that respective surface portions and recesses of adjacent cells are juxtaposed.

8. An airfoil structure in a model aircraft comprising a core of plastic polymeric material, said core having a chordwise cross section having opposite faces defining opposite contours of an airfoil profile, said opposite faces having a plurality of intersecting rows of successive surface portions and recesses, the recesses and surface portions in adjacent rows being offset from each other so that cross sections of first said rows define crenellated structural elements, portions of said crenellated structural elements defining surface portions on one of said opposite faces and bottoms of recesses in the other of said opposite faces, and covering means coupled to said core and overlying said opposite faces so that said covering means defines airfoil surfaces.

9. An airfoil structure in a model aircraft comprising a core of plastic polymeric material, said core having opposite outer faces and an outer chordwise cross section defining opposite contours of an airfoil profile, said core comprising a series of chordwise cells in side-by-side relation, each of said cells comprising a leading edge member, a trailing edge member, a crenellated member defining alternate and successive surface portions and recesses on opposite faces extending between said leading and trailing edge members, and rib elements at opposite edges of said crenellated member, the crenellated members of adjacent cells being offset so that respective surface portions and recesses of adjacent cells are juxtaposed, and covering means coupled to said core and overlying said opposite outer faces so that said covering means defines airfoil surfaces.

References Cited

UNITED STATES PATENTS

| | | |
|---|---|---|
| 2,230,393 | 2/1941 | Thompson. |
| 2,767,436 | 10/1956 | Noland et al. |
| 3,273,281 | 9/1966 | Harrison _____ 46—76 |

LOUIS G. MANCENE, Primary Examiner

R. F. CUTTING, Assistant Examiner